Figure 1:
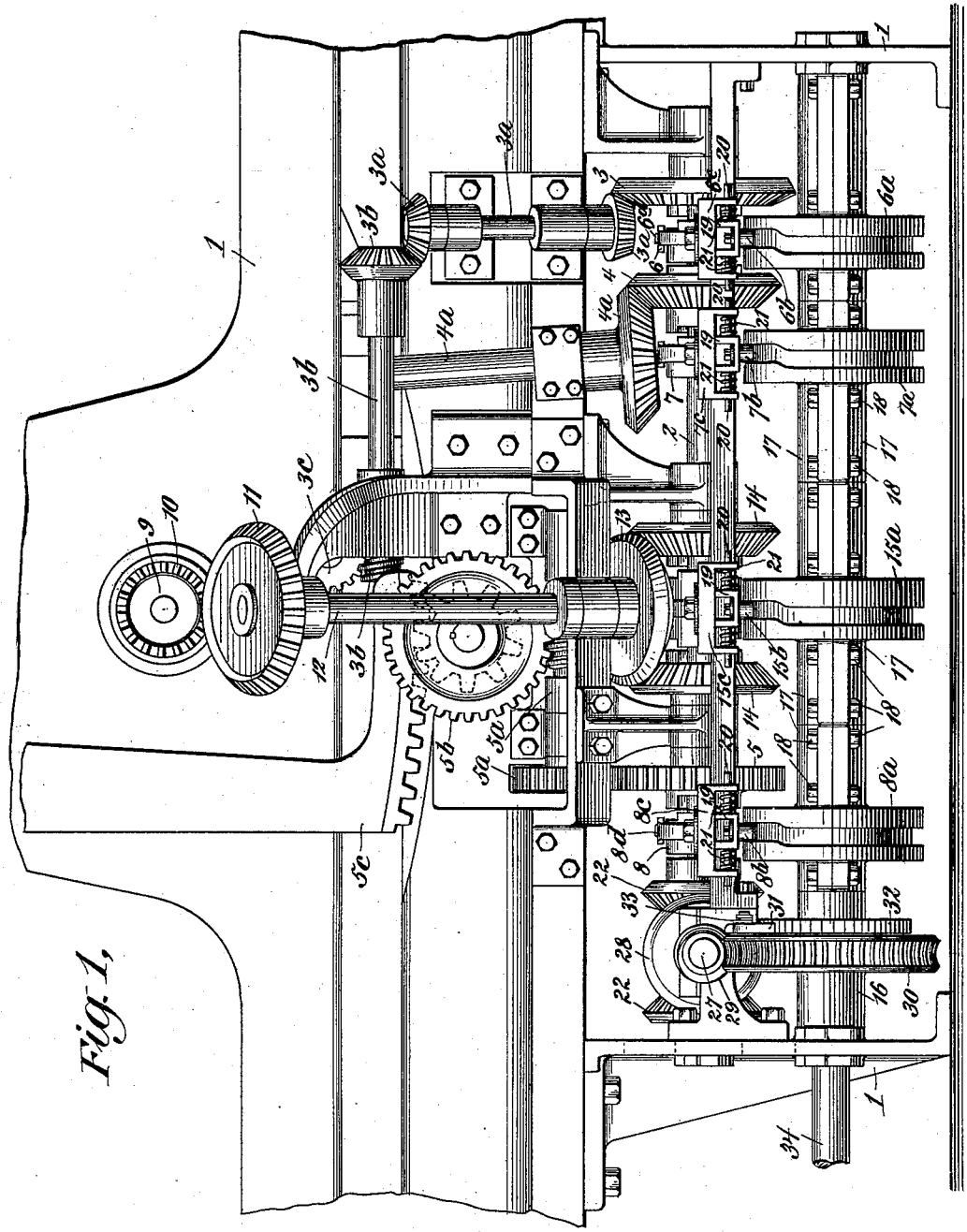

No. 637,570. Patented Nov. 21, 1899.
E. HETT.
CONTROLLING ENGINE FOR PRESSES.
(Application filed Sept. 8, 1898.)

(No Model.) 4 Sheets—Sheet 1.

WITNESSES: INVENTOR
Edward Hett
BY
ATTORNEYS

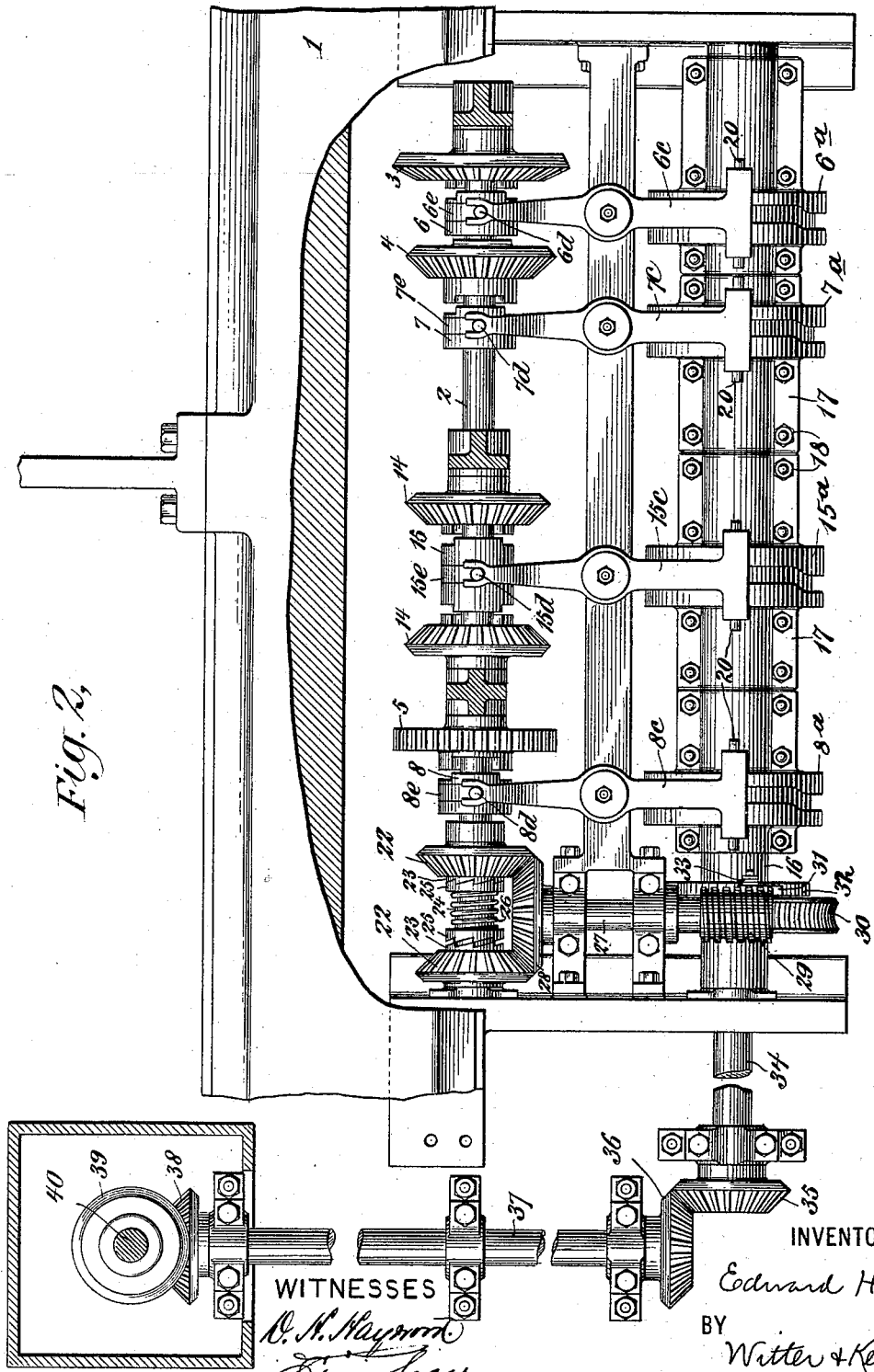

No. 637,570. Patented Nov. 21, 1899.
E. HETT.
CONTROLLING ENGINE FOR PRESSES.
(Application filed Sept. 8, 1898.)

(No Model.) 4 Sheets—Sheet 3.

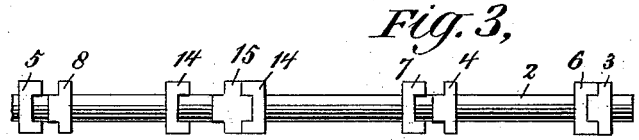
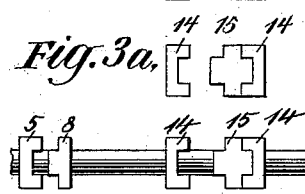
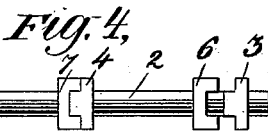
Fig. 3b. 1st Operation. Damper moves to Form Cylinder

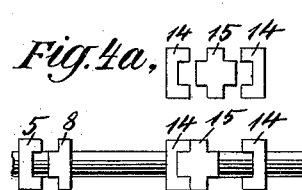
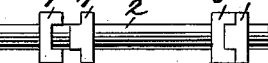
Fig. 4b. 2nd Operation. Ink Roller moves to Form Cylinder

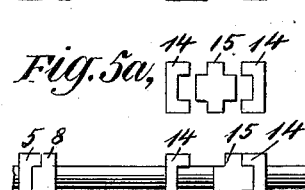
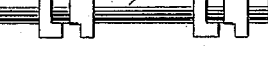
Fig. 5b. 3rd Operation. Damper moves away from Form Cylinder

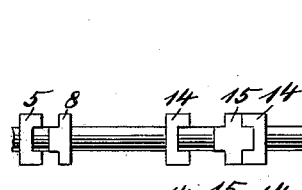
Fig. 6b. 4th Operation. Form Cylinder moves to Drum

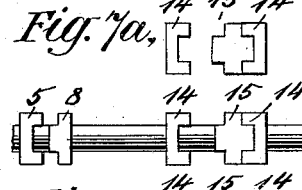
Fig. 7b. 5th Operation. Damper moves into working position

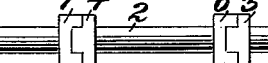
Fig. 8b. 6th Operation. Ink Roller moves in to working position

Fig. 9b. 7th Operation. All move into rest position

WITNESSES:

INVENTOR
Edward Hett
BY
Witter & Kenyon
ATTORNEYS

No. 637,570. Patented Nov. 21, 1899.
E. HETT.
CONTROLLING ENGINE FOR PRESSES.
(Application filed Sept. 8, 1898.)
(No Model.) 4 Sheets—Sheet 4.
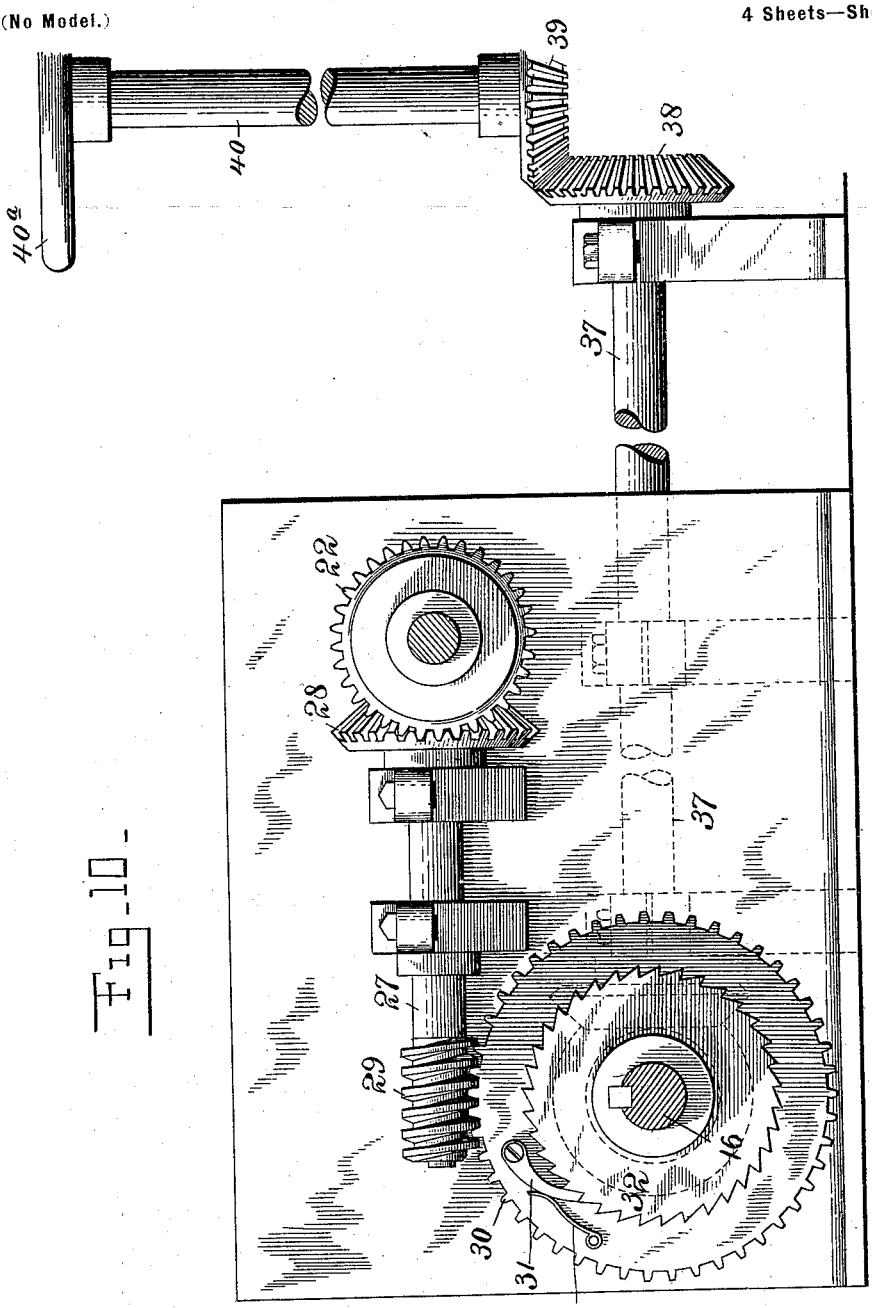
WITNESSES:
INVENTOR
Edward Hett
BY
Kenyon & Kenyon
ATTORNEYS

UNITED STATES PATENT OFFICE.

EDWARD HETT, OF NEW YORK, N. Y.

CONTROLLING-ENGINE FOR PRESSES.

SPECIFICATION forming part of Letters Patent No. 637,570, dated November 21, 1899.

Application filed September 8, 1898. Serial No. 690,478. (No model.)

*To all whom it may concern:*

Be it known that I, EDWARD HETT, a citizen of the United States, and a resident of New York, (New Dorp,) in the county of Richmond, State of New York, have invented certain new and useful Improvements in Controlling-Engines for Presses, of which the following is a specification.

My invention relates to presses, and more especially to devices for controlling the movements of parts of the mechanism in such presses—as, for example, for controlling the movements, in a lithographic press, of the printing-surfaces, the inking mechanisms, and the damping mechanism into and out of operative position.

It has for its object to provide means for controlling the movements of parts of presses, especially movements of parts of the press into and out of operative position, to effect such control more easily, efficiently, and with greater precision and certainty than has heretofore been possible, and preferably to do this automatically and without requiring a change in the direction of the motive power.

It consists of certain features of construction and combinations of parts herein shown and described.

I will now proceed to describe the preferred form of my improved device, shown in the drawings, in which the same reference-numbers in different figures refer to corresponding parts.

Figure 1 is a side elevation of my improved device in its preferred form. Fig. 2 is a plan with certain parts omitted and showing in addition a shaft to turn the cam-shaft, adapted to be operated by hand, as hereinafter described. Figs. 3, 3$^a$, 4, 4$^a$, 5, 5$^a$, 6, 7, 7$^a$, 8, 8$^a$, and 9, and Figs. 3$^b$, 4$^b$, 5$^b$, 6$^b$, 7$^b$, 8$^b$, and 9$^b$, illustrating the first, second, third, fourth, fifth, sixth, and seventh operations, are diagrammatic to illustrate the operation of the various cams, clutches, and gear-wheels upon one another and the effects produced thereby upon the parts of the printing mechanism of the press. Fig. 10 is a detail of pawl 31 and wheel 32 and their connections.

My improved devices are primarily intended to be used with and are here described as appurtenant to a multicolor lithographic printing press such as is shown and described in my application for a patent filed on the 1st day of June, 1896, known as Serial No. 503,796; but I do not limit my improved devices here shown and claimed to use in such a press, as it is evident that they can be employed in connection with any lithographic or other press in which rollers for printing, inking, damping, or any similar purpose, or other parts of the press are to be moved—as, for example, toward and away from an impression or printing surface.

In the operation of the multicolor-press in connection with which my improved devices are here shown and described it is necessary to move the entire series of printing-surfaces out of or into contact with the impression-surface, to move the inking mechanisms out of or into contact with the printing-surfaces by swinging the ink-frames carrying the inking mechanism, and to move the damping mechanisms out of or into contact with the printing-surfaces by swinging the damping-frames carrying the damping mechanisms, and it is in connection with these movements and to control them that my improved devices are herein shown and described.

In the preferred form of my improved controlling-engine shown and described herein I employ connecting mechanism or mechanisms between the driving mechanism of the controlling-engine (hereinafter referred to) and the part or parts of the press to be moved, connecting the said driving mechanism with the said part or parts of the press, driving mechanism preferably driven by the driving mechanism of the press for imparting motion through the said connecting mechanism or mechanisms to the said part or parts of the press to be moved, and suitable clutch mechanism, preferably automatically operated, to connect and disconnect the driving mechanism of the controlling-engine with some suitable source of power, preferably the driving mechanism of the press and to connect the said driving mechanism of the controlling-engine with the said connecting mechanism or mechanisms and to disconnect them. I prefer to use in my controlling-engine driving mechanism which is capable of motion in either direction, as I am thus enabled by the use of the same controlling mechanism to impart to the part or parts of the press to be moved a movement one way or the other, as desired. Such movement one way or the other I obtain by employing, preferably between the source of power and the driving mechanism of the controlling-engine, clutch mechanism, preferably, which is capable of assuming any of the three separate positions in one of which the source of power is wholly disconnected from the driving mechanism of the controlling-engine, in which case the part or parts of the press to be moved remain at rest, and in the other two of which positions the driving mechanism of the controlling-engine is connected with the source of power in one of said positions to impart motion in one direction to the driving mechanism of the controlling-engine to move the part or parts of the press one way and in the other of said positions to impart motion in the opposite direction to the driving mechanism of the controlling-engine to move the said part or parts of the press the other way. My preferred form of mechanism for this purpose is shown in the drawings and consists of two clutch gear-wheels intermediate between the source of power and the main shaft of my controlling-engine and a clutch adapted to cause one or the other or neither of the clutch gear-wheels to connect the source of power with the said shaft, although, of course, any other mechanism suitable for the purpose may be employed.

I will now proceed to describe the particular form of controlling-engine shown in the drawings herein.

1 represents the framework of the press.

2 is a shaft adapted to rotate in either direction, having loosely mounted upon it a number of gear-wheels 3, 4, and 5. These gear-wheels are capable of connecting shaft 2 with trains of gearing connected with different parts of the press to be moved, such as the damping or inking mechanisms or the printing-cylinders, for the purpose of moving such parts in a manner and for purposes presently to be described, or of disconnecting shaft 2 from such trains of gearing. Shaft 2 carries with it in its rotation a number of clutches 6 7 8, which clutches rotate with the shaft, but are splined thereon, so as to be capable of motion longitudinally along the shaft, and are adapted, as will be hereinafter described, to make contact with gear-wheels 3, 4, and 5, respectively, so as to cause the gear-wheels then to rotate with the shaft. For the sake of brevity shaft 2 will hereinafter be generally spoken of as the "clutch-shaft."

$3^a$, $3^b$, and $3^c$ form a train of gearing meshing with bevel gear-wheels 3 and transmitting motion from shaft 2 through gear-wheel 3 to frames carrying the damping-rollers. Such frames and damping mechanism are not here shown in detail, but are illustrated as to their mode of operation in the operations shown upon Sheet 3 of the drawings, where $3^e$ represents a damping-roller at the end of swinging frame $3^d$, mounted upon the shaft of $3^c$. When bevel gear-wheel 3 rotates with shaft 2 in one direction, damping-roller $3^e$ is swung against printing or form cylinder $5^d$, as shown in the first operation on Sheet 3, and when gear-wheel 3 rotates with shaft 2 in the other direction damping-roller $3^e$ is swung back from the form-cylinder, as shown in the third operation on the same sheet. In the same way $4^a$ represents a train of gearing meshing with bevel gear-wheel 4 and transmitting motion to frames carrying the inking-rollers. These are not shown in detail, but are illustrated in the operations shown upon Sheet 3, where $4^d$ $4^d$ represent inking-rollers supported upon a swinging frame $4^c$, mounted upon shaft $4^b$. The inking-rollers are similarly swung against or away from form-cylinder $5^d$ as bevel gear-wheel 4 revolves one way or the other with clutch-shaft 2, as shown in the second and seventh operations, respectively. In the same way $5^a$, $5^b$, and $5^c$ represent a train of gearing meshing with spur-wheel 5 and transmitting motion to supports carrying the printing or form cylinders. These are not shown in detail; but for purposes of illustration the printing or form cylinder is shown in seven operations upon Sheet 3 as cylinder $5^d$. As gear-wheel 5 is rotated one way or the other by shaft 2 form-cylinder $5^d$ is swung against or away from the drum or impression cylinder $5^e$, as shown in the fourth and seventh operations, respectively.

Motion in one direction or the other is imparted to shaft 2 by the following-described mechanism:

9 is the main power-shaft and carries on its end bevel-gear 10, which meshes with bevel-gear 11 on shaft 12. The latter shaft has at its other end bevel-gear 13. Intermediate between this driving mechanism and shaft 2 are two beveled clutch gear-wheels 14 14, facing each other and loosely mounted upon shaft 2. They mesh with bevel gear-wheel 13.

15 is a double clutch splined upon shaft 2, so as to permit of longitudinal motion along the shaft, but adapted to rotate with the shaft. When this clutch remains midway between bevel gear-wheels 14 14, as shown in Fig. 2, shaft 2 does not revolve. When the clutch is moved to the right, in a manner to be presently described, it grips one of the gear-wheels 14, and thereby causes shaft 2 to rotate; but when the clutch is moved into contact with the other gear-wheel 14 it causes shaft 2 to be rotated in the opposite direction. Thus while shafts 9 and 12 always revolve in the same direction shaft 2 remains stationary or is rotated in one direction or the other, depending upon the position of clutch 15.

Clutches 6, 7, 8, and 15 are automatically operated by the following-described mechanism:

16 is a shaft carrying upon it four cam-surfaces $6^a$, $7^a$, $15^a$, and $8^a$. This shaft will hereinafter, for the sake of brevity, be spoken of as the "cam-shaft." The cam-surfaces act respectively upon pins $6^b$, $7^b$, $15^b$, and $8^b$ in the ends of four clutch-levers $6^c$, $7^c$, $15^c$, and $8^c$. The other ends of these clutch-levers carry pins $6^d$, $7^d$, $15^d$, and $8^d$, respectively, which run in grooves $6^e$, $7^e$, $15^e$, and $8^e$, respectively, in clutches 6, 7, 15, and 8. As cam-shaft 16 rotates cam-surfaces $6^a$, $7^a$, $15^a$, and $8^a$ force clutch-levers $6^c$, $7^c$, $15^c$, and $8^c$ to the right or left, thus throwing clutches 6, 7, 15, and 8 into or out of contact with the different gear-wheels mounted upon shaft 2, and thus different parts of the printing mechanism are swung into or out of operative position. As shown in the drawings, the cam-surfaces are all arranged alike; but in practice, by means of clamps 17, upon which the cam-surfaces are borne, and nuts 18, they are so arranged upon shaft 16 as to time correctly the respective operations of the different parts, as will hereinafter be more fully described.

In order to prevent breakage of any of the parts in case a cam-surface should throw one of the levers over at a time when the projecting part of the clutch is not exactly in line with the recess in its gear-wheel, pins $6^b$, $7^b$, $15^b$, and $8^b$ are each carried by a frame 19, mounted upon a sliding bar 20, passing through openings on each side of the clutch-levers. Springs 21, upon sliding bar 20 on each side of frame 19, tend to keep the frame and pin in the center of the end of the clutch. The pins, frame, and sliding bar and springs form a yielding connection between the cam-surface and the clutch, which prevents breakage or stoppage of the parts until the projecting part of the clutch comes into line with the recess in the gear-wheel.

In the preferred form of my device shown in the drawings shaft 16 is driven by shaft 2 but as shaft 16 must always rotate in the same direction, and as shaft 2 rotates sometimes in one direction and sometimes in the other and sometimes not at all, I have devised the following-described mechanism to change the varying motion of shaft 2 into a motion in one direction only for shaft 16 and to permit shaft 16 to be rotated independently of shaft 2, either to enable shaft 2 to be started or for any other purpose:

Loosely mounted upon shaft 2 are two beveled gear-wheels 22 22, facing each other and each having a collar 23, provided with ratchet-teeth, the teeth of one gear-wheel pointing in an opposite direction to those of the other gear-wheel. Upon shaft 2, between the gear-wheels, are two collars 25, each provided with ratchet-teeth and facing the ratchet-collar 23 of one of the gear-wheels. The collars 25 are loose upon shaft 2 and are arranged in any suitable manner, as by spline and feather, so as to rotate with the shaft, while free to slide a short distance longitudinally thereon. These collars are held toward the ratchet-collars 23 by coiled spring 26. As shaft 2 rotates in one direction the teeth of one of the collars 25 engage with the ratchet-teeth of one of the gear-wheels and rotate that wheel, while the teeth of the other collar 25 slip over the teeth of the other gear-wheel. As shaft 2 rotates in the other direction the latter gear-wheel is rotated, while the other remains loose upon the shaft.

27 is a shaft, hereinafter to be spoken of as the "connecting-shaft," having at one end a beveled gear-wheel 28, meshing with gear-wheels 22 22, and at its other end a worm 29, meshing with worm-wheel 30, loosely mounted upon shaft 16. Worm-wheel 30 carries a pawl 31, which engages with ratchet-wheel 32 upon shaft 16. Pawl 31 is held in engagement with ratchet-wheel 32 by spring 33. Whichever one of gear-wheels 22 is clutched and driven by shaft 2, connecting-shaft 27 is driven always in the same direction and, through worm 29, worm-wheel 30, pawl 31, and ratchet-wheel 32, it drives shaft 16 always in the same direction.

Shaft 16 has an extension 34, carrying on its end beveled wheel 35, which meshes with beveled wheel 36 on one end of shaft 37. A beveled wheel 38 on the other end of this shaft meshes with a beveled wheel 39 on a shaft 40. On the other end of shaft 40 a hand-wheel $40^a$ or equivalent device is placed, adapted to be operated by hand. Whenever it is desired to turn cam-shaft 16 independently of shaft 2—as, for example, for the purpose of starting shaft 2 as it lies at rest with clutch 15 in the center, midway between gear-wheels 14 14—the hand-wheel on shaft 40 is turned and shaft 16 is rotated until clutch 15 is thrown into contact with one of the gear-wheels 14, when the controlling mechanism is at once started.

I will now proceed to describe the operation of my improved device in its preferred form as applied automatically to a multicolor lithographic press, as illustrated in the figures upon Sheet 3 of the drawings. The cam-surfaces upon shaft 16 are adjusted so as to time the various movements to produce the following successive operations:

*First operation.*—Shaft 16 is rotated by turning hand-wheel upon shaft 40 until cam-surface $15^a$, through clutch-lever $15^c$, throws clutch 15 to the right into contact with gear-wheel 14. This rotates shaft 2 in a certain direction. At the same time cam-surface $6^a$, through clutch-lever $6^c$, throws clutch 6 into contact with gear-wheel 3, and thus, through the train of gearing $3^a$, $3^b$, $3^c$, and $3^d$, swings damping-roller $3^e$ into contact with printing or form cylinder $5^d$, thus dampening that cylinder. Cam-surface $6^a$ then causes clutch 6 to move away from gear-wheel 3. This operation is illustrated by Figs. 3 and $3^b$, first operation, and Fig. $3^a$, on Sheet 3, and causes the printing-cylinder to be preliminarily dampened.

*Second operation.*—Clutch 7 is then thrown by its cam-surface into contact with gear-wheel 4, and thereby ink-rollers $4^d$ $4^d$ are swung against the form-cylinder, which is thereby inked. Clutches 15 and 7 then return to their original positions. This operation is illustrated by Figs. 4 and 4ᵇ, second operation, and Fig. 4ᵃ, and causes the printing-cylinder to be preliminarily inked.

*Third operation.*—Shaft 16 is then slightly turned by hand and clutch 15 is then thrown to the left into contact with the other gear-wheel 14, thus reversing the direction of rotation of shaft 2, and at the same time clutch 6 makes contact with gear-wheel 3, thus withdrawing damping-roller 3ᵉ from form-cylinder 5ᵈ. Clutches 15 and 6 are then withdrawn to their original positions. This operation is illustrated by Figs. 5 and 5ᵇ, third operation, and Fig. 5ᵃ. The reason for this operation is because in the construction of parts illustrated in the drawings the printing-cylinder cannot be moved into contact with the impression-drum while the damping-rollers are in the position shown in Fig. 4ᵇ. It is accordingly necessary first to remove the damping mechanism away from the printing-cylinder.

*Fourth operation.*—Shaft 16 is then further turned by hand, clutch 15 is thrown to the right, and clutch 8 is thrown into contact with gear-wheel 5, swinging form-cylinder 5ᵈ into contact with impression-cylinder 5ᵉ, thus starting the printing operation. Clutch 8 is then withdrawn from gear-wheel 5, while clutch 15 remains to the right. This operation is illustrated by Figs. 6 and 6ᵇ, fourth operation.

*Fifth operation.*—Clutch 6 is then thrown into contact with gear-wheel 3, thus bringing the damping-roller again into contact with the form-roller. Clutch 6 is then withdrawn into its original position. This operation is illustrated by Figs. 7 and 7ᵇ, fifth operation, and Fig. 7ᵃ.

*Sixth operation.*—Clutch 7 is moved into contact with gear-wheel 4, swinging the inking-rollers again into contact with the form-cylinder. In this position of the parts the damping, inking, and printing operations are all proceeding at the same time. Clutches 15 and 7 are then withdrawn into their original positions. This operation is illustrated in Figs. 8 and 8ᵇ, sixth operation, and Fig. 8ᵃ. The press is now in full operation, but the motion of the cam-shaft has ceased.

In the preferred form of my improvement all of the above steps except that of the starting of the first, third, and fourth operations, have been taken automatically through the action of the cams upon the cam-shaft. When it is desirable to stop the printing operation, the operator then turns the hand-wheel slightly, which brings clutch 15 into contact with the left-hand gear-wheel 14, rotating the clutch-shaft in the opposite direction and causing the seventh operation.

*Seventh operation.*—Shaft 16 is then further turned by hand, clutch 15 is moved into contact with the left-hand gear-wheel 14, and clutches 6, 7, and 8 are also moved into contact with their respective gear-wheels, when the form-cylinder and damping and inking rollers are all moved back into their original or rest positions. This operation is illustrated in Figs. 9 and 9ᵇ, and seventh operation.

By my improved device in its preferred form a complete, efficient, and automatic control is maintained over the printing mechanism and the operation of printing, and the various steps are taken automatically and successively in their proper time and order.

The cam-surfaces 6ᵃ, 7ᵃ, and 8ᵃ are so arranged as to keep their respective clutches in contact with their respective gear-wheels for only such a length of time as is necessary to swing the damping or inking rollers or the form-cylinder from a position of rest to an operative position, or vice versa. The cams upon the cam-shaft can of course be arranged in other ways than those above described and so as to cause the different parts of the press to move in a different order and arrangement and at different times from those above set forth in the above-described operations.

The automatic movement of the parts into or out of operative position is independent of the ordinary operation of the press. Thus, for example, when the inking or damping mechanisms, or either of them, has been moved out of operative position the press may still continue running, but no inking or damping, as the case may be, will take place, because such part or parts have been moved out of operative position.

In the form of controlling-engine shown in the drawings the driving mechanism of the controlling-engine consists of the shaft 2 and its connections. The source of power for the controlling-engine is the driving mechanism of the press, acting through shaft 12 and its connections. The connecting mechanism between the driving mechanism of the controlling-engine and the damping-frames consists of the train of gearing comprising gear 3, shaft 3ᵃ, and the other gearing connecting said shaft 3ᵃ with the damping-frames. The connecting mechanism between the driving mechanism of the controlling-engine and the inking-frames consists of the train of gearing comprising gear 4, shaft 4ᵃ, and the other gearing connecting said shaft 4ᵃ with the ink-frames. The connecting mechanism between the driving mechanism of the controlling-engine and the printing-surfaces consists of the train of gearing comprising gear-wheel 5, shaft 5ᵃ, and the other gearing connecting said shaft with the printing-surfaces. The clutch mechanism to connect the source of power—the driving mechanism of the press—with the driving mechanism of the controlling-engine consists of the two clutch gear-wheels 14 and 14 and clutch 15. The clutch mechanism to connect the driving mechanism of the controlling-engine with the connecting mechanism leading to the damping-frames consists of the gear-wheel 3 and clutch 6. Similarly the clutch mechanism to connect the driving mechanism of the controlling-engine with the connecting mechanism leading to the inking mechanisms consists of gear-wheel 4 and clutch 7, and the clutch mechanism to connect the said driving mechanism with the connecting mechanism leading to the printing-surfaces consists of gear-wheel 5 and clutch 8.

In the drawings in this case my controlling-engine has been shown as controlling the movements of the printing, inking, and damping devices only; but it can of course be applied to control the movements of any other part of the press which it may be desired to move.

The driving mechanism of my controlling-engine may be driven from any suitable source of power, although I prefer to drive it, as shown in the drawings, by the driving mechanism of the press.

In the preferred form of my improved device as shown the connecting mechanisms intervening between the driving mechanism of the controlling-engine and the different parts of the press are shown as consisting of trains of gearing. Such connecting mechanisms may, however, consist of any other form of mechanism suitable for the purpose. Likewise the means for operating the clutch mechanisms may be varied from those shown in the drawings.

My improved devices are simple in character, compact in form, and are easily operated. By means of them the movements of different parts of the press are easily, automatically, and quickly controlled, and the operator is enabled to move such parts automatically to any desired position with certainty and precision and to time such movements with exactness without any supervision other than is required to turn the hand-wheel to start the operations.

This application is designated as "Case B" to distinguish it from two other applications for controlling-engines filed by me simultaneously herewith and designated as "Case A" and "Case C."

What I claim as new, and desire to secure by Letters Patent, is—

1. In a controlling-engine for a press, a shaft adapted to revolve in either direction, a plurality of trains of gearing connecting with different parts of the press to be moved, a gear-wheel intermediate between said shaft and each train of gearing and capable of connecting or disconnecting the shaft with said train of gearing, whereby when connected to the shaft the train of gearing will be driven in one way or the other as the shaft is revolved in one direction or the other and when disconnected the train of gearing will remain at rest, an automatically-controlled clutch mechanism for each train of gearing adapted to connect or disconnect the shaft to said train of gearing through said gear-wheel, suitable driving mechanism, two gear-wheels intermediate between said shaft and said driving mechanism and capable of connecting or disconnecting the driving mechanism with the shaft and of driving said shaft in one direction when one gear-wheel is in operative connection and of driving it in the other direction when the other gear-wheel is in operative connection, and automatically-controlled clutch mechanism adapted to connect the driving mechanism to the shaft through either one of said gear-wheels or to wholly disconnect the driving mechanism and the shaft, substantially as set forth.

2. In a controlling-engine for a press, a shaft adapted to revolve in either direction, means for revolving it in either direction, a train of gearing connecting with a part of the press to be moved, a gear-wheel intermediate between said shaft and the train of gearing and capable of connecting or disconnecting the shaft with the train of gearing, whereby when connected to the shaft the train of gearing will be driven in one way or the other as the shaft is revolved in one direction or the other and when disconnected the train of gearing will remain at rest, and an automatically-controlled clutch mechanism adapted to connect or disconnect the shaft to the said train of gearing through said gear-wheel, substantially as set forth.

3. In a controlling-engine for a press, a shaft adapted to revolve in either direction, means for revolving it in either direction actuated by the main driving mechanism of the press, a train of gearing connecting with a part of the press to be moved, a gear-wheel intermediate between said shaft and the train of gearing and capable of connecting or disconnecting the shaft with the train of gearing, whereby when connected to the shaft the train of gearing will be driven in one way or the other as the shaft is revolved in one direction or the other and when disconnected the train of gearing will remain at rest, and an automatically-controlled clutch mechanism adapted to connect or disconnect the shaft to the said train of gearing through said gear-wheel, substantially as set forth.

4. In a controlling-engine for a press, a shaft adapted to revolve in either direction, means for revolving it in either direction, a train of gearing connecting with the damping mechanism of a lithographic press, a gear-wheel intermediate between said shaft and the train of gearing and capable of connecting or disconnecting the shaft with the train of gearing, whereby when connected to the shaft the train of gearing will be driven so as to move the damping mechanism in one direction or the other as the shaft is revolved in one direction or the other and when the train of gearing is disconnected, the damping mechanism will remain at rest, and an automatically-controlled clutch mechanism adapted to connect or disconnect the shaft to the said train of gearing through said gear-wheel, whereby the operation of damping a printing-cylinder of the press may be automatically controlled, substantially as set forth.

5. In a controlling-engine for a press, a shaft adapted to revolve in either direction, means with the train of gearing, and a cam for actuating the clutch, mounted upon a shaft, and means for transmitting motion from the clutch-shaft to the cam-shaft so as to drive the cam-shaft always in the same direction no matter what the direction of revolution of the clutch-shaft, whereby the operation of the parts of the printing mechanism of the press may be automatically controlled substantially as set forth.

12. In a controlling-engine for a press, the combination with a shaft adapted to revolve in either direction and means for revolving it in either direction, trains of gearing connecting with parts of the press to be moved, gear-wheels loosely mounted upon said shaft and capable of connecting or disconnecting the shaft with said trains of gearing, whereby when connected to the shaft the trains of gearing will be driven in one way or the other as the shaft is revolved in one direction or the other and when disconnected the trains of gearing will remain at rest, clutches mounted upon the shaft for throwing the said gear-wheels into or out of rotation with the shaft to cause them to connect or disconnect the shaft with the trains of gearing, and cams for actuating the clutches, mounted upon a shaft, and means for transmitting motion from the clutch-shaft to the cam-shaft so as to drive the cam-shaft always in the same direction no matter what the direction of revolution of the clutch-shaft, whereby the operation of the parts of the printing mechanism of the press may be automatically controlled, substantially as set forth.

13. In a controlling-engine for a press, the combination with a shaft adapted to revolve in either direction, trains of gearing connecting with parts of the press to be moved, a gear-wheel for each train of gearing loosely mounted upon said shaft and capable of connecting or disconnecting the shaft with its train of gearing and clutches for said gear-wheels adapted when thrown into contact with said gear-wheels, to cause them to rotate with the shaft and to connect their respective trains of gearing with the shaft, of two gear-wheels loosely mounted upon the shaft, a power-transmitting shaft having a gear-wheel meshing with said two gear-wheels, and a clutch automatically actuated and adapted to cause one or the other of said two gear-wheels to revolve with the shaft upon which it is mounted, all so arranged that, when the clutch is in contact with one of said gear-wheels, the shaft will revolve in one direction and when the clutch is in contact with the other gear-wheel the shaft will revolve in the opposite direction, whereby the operation of the different parts of the printing mechanism of the press may be controlled, substantially as set forth.

14. In a controlling-engine for a press, the combination with a shaft adapted to revolve in either direction, trains of gearing connecting with parts of the press to be moved, a gear-wheel for each train of gearing loosely mounted upon said shaft and capable of connecting or disconnecting the shaft with its train of gearing and clutches for said gear-wheels operated by the main driving mechanism of the press and adapted when thrown into contact with said gear-wheels, to cause them to rotate with the shaft and to connect their respective trains of gearing with the shaft, of two gear-wheels loosely mounted upon the shaft, a power-transmitting shaft driven by the main driving mechanism of the press having a gear-wheel meshing with said two gear-wheels, and a clutch operated by the main driving mechanism of the press and adapted to cause one or the other of said two gear-wheels to revolve with the shaft upon which it is mounted, all so arranged that, when the clutch is in contact with one of said gear-wheels, the shaft will revolve in one direction and when the clutch is in contact with the other gear-wheel the shaft will revolve in the opposite direction, whereby the operation of the different parts of the printing mechanism of the press may be controlled, substantially as set forth.

15. In a controlling-engine for a press, the combination with a shaft adapted to revolve in either direction and means for revolving it in either direction, of trains of gearing connecting with parts of the press to be moved, gear-wheels loosely mounted upon said shaft, and capable of connecting or disconnecting the shaft with the said trains of gearing, clutches mounted upon the said shaft for throwing said gear-wheels into or out of rotation with the shaft and connecting or disconnecting the shaft with the trains of gearing, cams for actuating the clutches, mounted upon a cam-shaft, two gear-wheels loosely mounted upon the clutch-shaft, each having ratchet-teeth pointing in the opposite direction to that of the ratchet-teeth of the other wheel, a clutch rotating with the clutch-shaft and splined thereto so as to be capable of longitudinal motion thereon and provided at each end with ratchet-teeth pointing in an opposite direction to that of the teeth at the other end and adapted to fit into the ratchet-teeth of the adjoining gear-wheel, all so arranged that, when the clutch-shaft revolves in one direction, the clutch will engage with and drive one only of said gear-wheels and, when it revolves in the other direction, it will engage with and drive only the other of said wheels, a connecting-shaft having a gear-wheel meshing with both of said wheels upon the clutch-shaft and also having gearing connecting with and driving the cam-shaft, whereby the cam-shaft will revolve whenever the clutch-shaft revolves and will always be driven in the same direction no matter what the direction of revolution of the clutch-shaft, substantially as set forth.

16. In a controlling-engine for a press, the combination with a shaft adapted to revolve in either direction, trains of gearing connecting with different parts of the press to be moved, a gear-wheel for each train of gearing loosely mounted upon said shaft and capable of connecting or disconnecting said shaft with its train of gearing, and a clutch for each gear-wheel mounted upon said shaft and adapted, when thrown into contact with its gear-wheel, to cause it to rotate with the shaft to connect or disconnect the shaft with its train of gearing, of two gear-wheels loosely mounted upon the shaft, a power-transmitting shaft driven by the main driving mechanism of the press and having a gear-wheel meshing with said two gear-wheels, and a clutch adapted to cause one or the other of said two gear-wheels to revolve with the shaft upon which it is mounted, all so arranged that, when the clutch is in contact with one of the said gear-wheels, its shaft will revolve in one direction and, when the clutch is in contact with the other gear-wheel, the shaft will revolve in the opposite direction, clutch-levers, adapted to actuate the clutches, a cam-shaft having a series of cams thereon to operate the clutch-levers, two gear-wheels loosely mounted upon the clutch-shaft, a clutch upon said shaft adapted, when the shaft rotates in one direction, to engage with and drive one of the gear-wheels, and when the shaft revolves in the other direction, to engage with and drive the other of the said gear-wheels, a connecting-shaft having a gear-wheel meshing with both of said wheels upon the clutch-shaft and also having gearing connecting with and driving the cam-shaft, whereby the cam-shaft will revolve as the clutch-shaft revolves and will always be driven in the same direction no matter what the direction of revolution of the clutch-shaft, and whereby the operation of different parts of the press will be automatically controlled and the said several parts may be moved into or out of operative position in regular and orderly sequence, substantially as set forth.

17. In a controlling-engine for a press, the combination with a shaft adapted to revolve in either direction, trains of gearing connecting with different parts of the press to be moved, a gear-wheel for each train of gearing loosely mounted upon said shaft and capable of connecting or disconnecting said shaft with its train of gearing and a clutch for each gear-wheel mounted upon said shaft and adapted, when thrown into contact with its gear-wheel, to cause it to rotate with the shaft to connect or disconnect the shaft with the train of gearing, of two gear-wheels loosely mounted upon the shaft, a power-transmitting shaft driven by the main driving mechanism of the press and having a gear-wheel meshing with said two gear-wheels, and a clutch adapted to cause one or the other of said two gear-wheels to revolve with the shaft upon which it is mounted, all so arranged that, when the clutch is in contact with one of said gear-wheels, its shaft will revolve in one direction and, when the clutch is in contact with the other gear-wheel, the shaft will revolve in the opposite direction, clutch-levers, adapted to actuate the clutches, a cam-shaft having a series of cams thereon to operate the clutch-levers, two gear-wheels loosely mounted upon the clutch-shaft each having ratchet-teeth pointing in the opposite direction to that of the ratchet-teeth of the other wheel, a clutch rotating with the clutch-shaft and splined thereto so as to be capable of longitudinal motion thereon and provided at each end with ratchet-teeth pointing in an opposite direction to that of the teeth at the other end and adapted to fit into the ratchet-teeth of the adjoining gear-wheel, all so arranged that, when the clutch-shaft revolves in one direction, the clutch will engage with and drive one only of said wheels and, when it revolves in the other direction, it will engage with and drive only the other of said wheels, a connecting-shaft having, at one end, a beveled gear-wheel meshing with both of the said gear-wheels upon the clutch-shaft, and, at the other end, a worm engaging with a worm-wheel, a pawl upon said wheel engaging with and driving a ratchet-wheel upon the cam-shaft, whereby the cam-shaft will revolve as the clutch-shaft revolves and will always be driven in the same direction no matter what the direction of revolution of the clutch-shaft, and whereby the operation of different parts of the press will be automatically controlled, substantially as set forth.

18. The combination with a shaft having gear-wheels loosely mounted thereon, means for driving said shaft, clutches splined upon said shaft and adapted to engage with said gear-wheels and cause them to rotate with the shaft, levers to force the clutches into engagement with the gear-wheels, of a second shaft having a series of cams engaging with and operating the clutch-levers and means for driving said cam-shaft, whereby the rotation of the cam-shaft will operate the clutches and rotate the gear-wheels, substantially as set forth.

19. The combination with a shaft having gear-wheels loosely mounted thereon, means for driving said shaft, clutches splined upon said shaft and adapted to engage with said gear-wheels and cause them to rotate with the shaft, levers to force the clutches into engagement with the gear-wheels, of a second shaft having a series of cams engaging with pins, connected to the clutch-levers by spring attachments, and operating the clutch-levers, and means for driving said shaft, whereby the rotation of the cam-shaft will operate the clutches and rotate the gear-wheels, substantially as set forth.

20. In combination with a driving-shaft, adapted to revolve in either direction, and another shaft, adapted to revolve in but one direction, of two gear-wheels loosely mounted upon the first shaft, a clutch upon said shaft adapted, when the shaft rotates in one direction, to engage with and drive one of the gear-wheels, and when the shaft revolves in the other direction, to engage with and drive the other of the said gear-wheels, a connecting-shaft for transmitting motion from the driving-shaft to the other shaft, having a gear-wheel meshing with both of said wheels upon the driving-shaft and having gearing connecting with and driving the second shaft, whereby the second shaft will always be driven in the same direction no matter what the direction of revolution of the driving-shaft, substantially as set forth.

21. In a controlling-engine for a press, the combination with a clutch-shaft, adapted to be driven in either direction, gear-wheels loosely mounted thereon, clutches for throwing said wheels into or out of rotation with the clutch-shaft, levers for actuating the clutches, a cam-shaft having cams thereon to operate the levers, of two gear-wheels loosely mounted upon the clutch-shaft, a clutch upon said shaft adapted, when the shaft rotates in one direction, to engage with and drive one of the gear-wheels, and when the shaft revolves in the other direction, to engage with and drive the other of the said gear-wheels, a connecting-shaft having a gear-wheel meshing with both of said wheels upon the clutch-shaft and also having gearing connecting with and driving the cam-shaft, whereby the cam-shaft will always be driven in the same direction no matter what the direction of revolution of the clutch-shaft, substantially as set forth.

22. In combination with a driving-shaft, adapted to revolve in either direction, and another shaft, adapted to revolve in but one direction, of two gear-wheels loosely mounted upon the first shaft, each having ratchet-teeth pointing in the opposite direction to that of the ratchet-teeth of the other wheel, a clutch rotating with the driving-shaft and splined thereto so as to be capable of longitudinal motion thereon and provided at each end with ratchet-teeth pointing in an opposite direction to that of the teeth at the other end and adapted to fit into the ratchet-teeth of the adjoining gear-wheel, adapted, when the shaft rotates in one direction, to engage with and drive one of the gear-wheels, and when the shaft revolves in the other direction, to engage with and drive the other of the said gear-wheels, a connecting-shaft for transmitting motion from the driving-shaft to the other shaft, having a gear-wheel meshing with both of said wheels upon the driving-shaft and having gearing connecting with and driving the second shaft, whereby the second shaft will always be driven in the same direction no matter what the direction of revolution of the driving-shaft, substantially as set forth.

23. In combination with a driving-shaft, adapted to revolve in either direction and another shaft, adapted to revolve in but one direction, of two gear-wheels loosely mounted upon the first shaft, each having ratchet-teeth pointing in the opposite direction to that of the ratchet-teeth of the other wheel, a clutch rotating with the driving-shaft and splined thereto, so as to be capable of longitudinal motion thereon and provided at each end with ratchet-teeth pointing in an opposite direction to that of the teeth at the other end and adapted to fit into the ratchet-teeth of the adjoining gear-wheel, adapted, when the shaft rotates in one direction, to engage with and drive one of the gear-wheels, and when the shaft revolves in the other direction, to engage with and drive the other of the said gear-wheels, a connecting-shaft for transmitting motion from the driving-shaft to the other shaft, having a gear-wheel meshing with both of said wheels upon the driving-shaft, a worm upon the connecting-shaft meshing with a worm-wheel, a pawl upon the worm-wheel engaging with a ratchet-wheel upon the second shaft, and means for turning the second shaft independently of the driving-shaft, whereby the second shaft will always be driven in the same direction no matter what the direction of revolution of the driving-shaft, and whereby the second shaft may be turned independently of the driving-shaft, substantially as set forth.

24. In a controlling-engine for a press, the combination with a clutch-shaft, adapted to be driven in either direction and means for driving it in either direction, trains of gearing connecting with parts of the press to be moved, a gear-wheel for each train loosely mounted upon the clutch-shaft and capable of connecting or disconnecting the clutch-shaft with its train of gearing, a clutch for each gear-wheel adapted to engage or disengage with said wheel to cause it to connect or disconnect the clutch-shaft with the train of gearing, a lever for actuating each clutch, and a cam-shaft having cams thereon to operate the levers, of two gear-wheels loosely mounted upon the clutch-shaft, each having ratchet-teeth pointing in the opposite direction to that of the ratchet-teeth of the other wheel, a clutch rotating with the clutch-shaft and splined thereto, so as to be capable of longitudinal motion thereon and provided at each end with ratchet-teeth pointing in an opposite direction to that of the teeth of the other end and adapted to fit into the ratchet-teeth of the adjoining gear-wheel, all so arranged that, when the clutch-shaft revolves in one direction, the clutch will engage with and drive one of said wheels and, when it revolves in the other direction, it will engage with and drive the other of said wheels, a connecting-shaft having gearing meshing with both of said gear-wheels upon the clutch-shaft and with the cam-shaft, whereby the cam-shaft will always be driven in the same direction no matter what the direction of revolution of the clutch-shaft, and whereby the operation of parts of the press will be automatically controlled, substantially as set forth.

25. In a controlling-engine for a press, the combination with a clutch-shaft, adapted to be driven in either direction, trains of gearing connecting with parts of the press to be moved, a gear-wheel for each train loosely mounted upon the clutch-shaft and capable of connecting or disconnecting the shaft with its train of gearing, a clutch for each wheel adapted to cause it to connect or disconnect the shaft with its train of gearing, a lever for actuating each clutch, a cam-shaft having cams thereon to operate the levers, of two beveled gear-wheels loosely mounted upon the clutch-shaft, each having ratchet-teeth pointing in the opposite direction to that of the ratchet-teeth of the other wheel, a clutch rotating with the clutch-shaft and splined thereto so as to be capable of longitudinal motion thereon and provided at each end with ratchet-teeth pointing in an opposite direction to that of the teeth at the other end and adapted to fit into the ratchet-teeth of the adjoining gear-wheel, all so arranged that, when the clutch-shaft revolves in one direction, the clutch will engage with and drive one of said wheels and, when it revolves in the other direction, it will engage with and drive the other of said wheels, a connecting-shaft having at one end a beveled gear-wheel meshing with both of the said gear-wheels upon the clutch-shaft, and at the other end a worm engaging with a worm-wheel connected with and adapted to drive the cam-shaft, whereby the cam-shaft will always be driven in the same direction no matter what the direction of revolution of the clutch-shaft, and whereby the operation of parts of the press will be automatically controlled, substantially as set forth.

26. In a controlling-engine for a press, the combination with a clutch-shaft, adapted to be driven in either direction, gear-wheels loosely mounted thereon, clutches for throwing said wheels into or out of rotation with the clutch-shaft, levers for actuating the clutches, a cam-shaft having cams thereon to operate the levers, of two beveled gear-wheels loosely mounted upon the clutch-shaft, each having ratchet-teeth pointing in the opposite direction to that of the ratchet-teeth of the other wheel, a clutch rotating with the clutch-shaft and splined thereto so as to be capable of longitudinal motion thereon and provided at each end with ratchet-teeth pointing in an opposite direction to that of the teeth at the other end and adapted to fit into the ratchet-teeth of the adjoining gear-wheel, all so arranged that, when the clutch-shaft revolves in one direction, the clutch will engage with and drive one only of said wheels and, when it revolves in the other direction, it will engage with and drive only the other of said wheels, a connecting-shaft having at one end a beveled gear-wheel meshing with both of the said gear-wheels upon the clutch-shaft, and at the other end a worm engaging with a worm-wheel, a pawl upon said wheel engaging with and driving a ratchet-wheel upon the cam-shaft, whereby the cam-shaft will always be driven in the same direction no matter what the direction of revolution of the clutch-shaft, substantially as set forth.

27. In a controlling-engine for a press, the combination with a shaft adapted to revolve in either direction and means for revolving it in either direction, of gear-wheels loosely mounted upon said shaft, connecting with the printing mechanism of the press, clutches for throwing said gear-wheels into or out of rotation with the shaft, and cams for actuating the clutches, mounted upon a shaft, of two gear-wheels loosely mounted upon the clutch-shaft, each having ratchet-teeth pointing in the opposite direction to that of the ratchet-teeth of the other wheel, a sleeve-clutch, mounted upon and rotating with the clutch-shaft but splined thereto so as to be capable of longitudinal motion thereon, a collar at each end of the sleeve-clutch adapted to slide thereon and provided with teeth on its outer face adapted to fit into the ratchet-teeth of the adjoining gear-wheel, a coiled spring around the sleeve to press the collars outward, all so arranged that, when the clutch-shaft revolves in one direction, the clutch will engage with and drive one only of said wheels and, when it revolves in the other direction, it will engage with and drive only the other of said wheels, a connecting-shaft having at one end a beveled gear-wheel meshing with both of the said gear-wheels upon the clutch-shaft, and at the other end a worm engaging with a worm-wheel connected with and adapted to drive the cam-shaft, whereby the cam-shaft will always be driven in the same direction no matter what the direction of revolution of the clutch-shaft, substantially as set forth.

28. In a controlling-engine for a press, the combination with a clutch-shaft, adapted to be driven in either direction, gear-wheels loosely mounted thereon, clutches for throwing said wheels into or out of rotation with the clutch-shaft, levers for actuating the clutches, a cam-shaft having cams thereon to operate the levers, of a connecting-shaft between the clutch-shaft and the cam-shaft, so arranged as to always rotate in the same direction, a wheel driven by said connecting-shaft having a pawl, a ratchet-wheel upon the cam-shaft into which the pawl is adapted to take to rotate the cam-shaft, and means for rotating the cam-shaft independently of the connecting-shaft, substantially as set forth.

29. In a press, the combination of a part of the press to be moved, a shaft adapted to rotate in either direction, connecting mechanism between the shaft and the said part of the press adapted to move the said part of the press one way or the other as the shaft rotates one way or the other, driving mechanism for rotating the said shaft in one direction or the other, two clutch gear-wheels intermediate between said shaft and said driving mechanism and capable of connecting them or disconnecting them, and of driving the said shaft in one direction when one gear-wheel is in operative connection and of driving it in the other direction when the other wheel is in operative connection, clutch mechanisms adapted to connect the driving mechanism to the shaft through either one of said gear-wheels or to wholly disconnect them, means, under the control of the operator, for causing the clutch mechanism to connect the two together, and means automatically actuated for causing the clutch mechanism to disconnect them, whereby the operation of the said part of the press may be controlled.

30. In a press, the combination of a part of the press to be moved, a shaft adapted to rotate in either direction, connecting mechanism between the shaft and the said part of the press adapted to move the said part of the press one way or the other as the shaft rotates one way or the other, driving mechanism for rotating the said shaft in one direction or the other, driven by the driving mechanism of the press, two clutch gear-wheels intermediate between said shaft and said driving mechanism and capable of connecting them or disconnecting them, and of driving the said shaft in one direction when one gear-wheel is in operative connection and of driving it in the other direction when the other wheel is in operative connection, clutch mechanisms adapted to connect the driving mechanism to the shaft through either one of said gear-wheels or to wholly disconnect them, means under the control of the operator, for causing the clutch mechanism to connect the two together, and means automatically actuated for causing the clutch mechanism to disconnect them, whereby the operation of the said part of the press may be controlled.

31. In a press, the combination with a printing-surface, of inking mechanism, and means for automatically moving the inking mechanism into or out of operative position independently of the ordinary operation of the press.

32. In a press, the combination with a printing-surface, of inking mechanism, driving mechanism, connecting mechanism between the driving mechanism and the inking mechanism, adapted to connect or disconnect the said driving mechanism and the inking mechanism, whereby when thus connected the inking mechanism will be moved into or out of operative position, clutch mechanism arranged and adapted to cause the said connecting mechanism to connect the driving mechanism with the inking mechanism or to disconnect them, and means for automatically operating the clutch mechanism, whereby the operation of the inking mechanism may be controlled.

33. In a press, the combination with a printing-surface, of inking mechanism, driving mechanism, connecting mechanism between the driving mechanism and the inking mechanism, adapted to connect or disconnect the said driving mechanism and the inking mechanism, whereby when thus connected the inking mechanism will be moved into or out of operative position, clutch mechanism arranged and adapted to cause the said connecting mechanism to connect the driving mechanism with the inking mechanism or to disconnect them, and means for automatically operating the clutch mechanism to connect the said parts and cause the inking mechanism to be automatically moved out of operative position.

34. In a press, the combination with a printing-surface, of damping mechanism, and means for automatically moving the damping mechanism into or out of operative position independently of the ordinary operation of the press.

35. In a press, the combination with a printing-surface, of damping mechanism, driving mechanism, connecting mechanism between the driving mechanism and the damping mechanism, adapted to connect or disconnect the said driving mechanism and the damping mechanism, whereby when thus connected the damping mechanism will be moved into or out of operative position, clutch mechanism arranged and adapted to cause the said connecting mechanism to connect the driving mechanism with the damping mechanism or to disconnect them, and means for automatically operating the clutch mechanism whereby the operation of the damping mechanism may be controlled.

36. In a press, the combination with a printing-surface, of damping mechanism, driving mechanism, connecting mechanism between the driving mechanism and the damping mechanism, adapted to connect or disconnect the said driving mechanism and the damping mechanism, whereby when thus connected the damping mechanism will be moved into or out of operative position, clutch mechanism arranged and adapted to cause the said connecting mechanism to connect the driving mechanism with the damping mechanism or to disconnect them, and means for automatically operating the clutch mechanism to connect the said parts and cause the damping mechanism to be automatically moved out of operative position.

37. In a lithographic press, the combination of a printing-surface, inking mechanism and damping mechanism therefor, and means for automatically moving the inking mechanism and damping mechanism into or out of operative position independently of the ordinary operation of the press.

38. In a lithographic press, the combination of an impression-surface, a printing-surface, inking mechanism and damping mechanism therefor, and means for automatically moving the printing-surface, inking mechanism and damping mechanism into or out of operative position independently of the ordinary operation of the press.

39. In a lithographic press, the combination of an impression-surface, a printing-surface, inking mechanism and damping mechanism therefor, and means for automatically moving the printing-surface, inking mechanism and damping mechanism into or out of operative position in predetermined sequence independently of the ordinary operation of the press.

40. In a lithographic press, the combination of a printing-surface, inking mechanism and damping mechanism therefor, and means for automatically moving the inking mechanism and damping mechanism into or out of operative position in predetermined sequence independently of the ordinary operation of the press.

41. In a press, the combination of an impression-surface, a printing-surface, inking mechanism therefor, and means for automatically moving the printing-surface and the inking mechanism into or out of operative position in predetermined sequence independently of the ordinary operation of the press.

42. In a lithographic press, the combination of an impression-surface, a printing-surface, inking mechanism and damping mechanism therefor, and means for automatically moving the printing-surface and the damping mechanism into or out of operative position in predetermined sequence independently of the ordinary operation of the press.

43. In a lithographic press, the combination of a printing-surface, inking mechanism and damping mechanism therefor, driving mechanism, connecting mechanisms between the driving mechanism and the inking mechanism and damping mechanism respectively, adapted to connect or disconnect the driving mechanism and the inking mechanism and damping mechanism respectively, whereby when either the inking mechanism or the damping mechanism is thus connected it will be moved into or out of operative position, clutch mechanisms arranged and adapted to cause the said connecting mechanisms to connect the driving mechanism with the inking mechanism and damping mechanism respectively or to disconnect them, and means for automatically operating the said clutch mechanisms in predetermined sequence, whereby the inking and damping mechanisms will be automatically moved into or out of operative position in predetermined sequence.

44. In a lithographic press, the combination of an impression-surface, a printing-surface, inking mechanism and damping mechanism therefor, driving mechanism, connecting mechanisms between the driving mechanism and the inking mechanism and damping mechanism and printing-surface respectively, adapted to connect or disconnect the driving mechanism and the inking mechanism and damping mechanism and printing-surface respectively, whereby when either the inking mechanism or the damping mechanism or printing-surface is thus connected it will be moved into or out of operative position, clutch mechanisms arranged and adapted to cause the said connecting mechanisms to connect the driving mechanism with the inking mechanism and damping mechanism and printing-surface respectively or to disconnect them, and means for automatically operating the said clutch mechanisms in predetermined sequence, whereby the inking and damping mechanisms and the printing-surface will be automatically moved into or out of operative position in predetermined sequence.

45. In a lithographic press, the combination of an impression-surface, a printing-surface, inking mechanism and damping mechanism therefor, driving mechanism, connecting mechanisms between the driving mechanism and the damping mechanism and printing-surface respectively, adapted to connect or disconnect the driving mechanism and the damping mechanism and printing-surface respectively, whereby when either the damping mechanism or printing-surface is thus connected it will be moved into or out of operative position, clutch mechanisms arranged and adapted to cause the said connecting mechanisms to connect the driving mechanism with the damping mechanism and printing-surface respectively or to disconnect them, and means for automatically operating the said clutch mechanisms in predetermined sequence, whereby the damping mechanism and the printing-surface will be automatically moved into or out of operative position in predetermined sequence.

46. In a press, the combination of an impression-surface, a printing-surface, inking mechanism therefor, driving mechanism, connecting mechanisms between the driving mechanism and the inking mechanism and printing-surface respectively, adapted to connect or disconnect the driving mechanism and the inking mechanism and printing-surface respectively, whereby when either the inking mechanism or printing-surface is thus connected it will be moved into or out of operative position, clutch mechanisms arranged and adapted to cause the said connecting mechanism to connect the driving mechanism with the inking mechanism and printing-surface respectively or to disconnect them, and means for automatically operating the said clutch mechanisms in predetermined sequence, whereby the inking mechanism and the printing-surface will be automatically moved into or out of operative position in predetermined sequence.

In testimony whereof I have signed my name to this specification in the presence of two subscribing witnesses.

EDWARD HETT.

Witnesses:
SIDNEY MANN,
EDWIN SEGER.